(12) United States Patent
Little, Jr. et al.

(10) Patent No.: US 7,157,547 B2
(45) Date of Patent: Jan. 2, 2007

(54) ULTRAVIOLET BLOCKING COMPOSITION FOR PROTECTION OF PACKAGE OR CONTAINER CONTENTS

(75) Inventors: Rondell Paul Little, Jr., Elizabethton, TN (US); Gether Irick, Jr., Gray, TN (US); Emerson Eston Sharpe, Jr., Kingsport, TN (US)

(73) Assignee: Eastman Chemical Company, Kingsport, TN (US)

( * ) Notice: Subject to any disclaimer, the term of this patent is extended or adjusted under 35 U.S.C. 154(b) by 0 days.

(21) Appl. No.: 10/712,606

(22) Filed: Nov. 13, 2003

(65) Prior Publication Data

US 2005/0107574 A1 May 19, 2005

(51) Int. Cl.
C08G 63/02 (2006.01)

(52) U.S. Cl. ............... 528/272; 264/176.1; 264/219; 359/642; 428/34.1; 428/35.7; 528/271

(58) Field of Classification Search ............ 264/176.1, 264/219; 428/34.1, 35.7; 359/642; 528/271, 528/272
See application file for complete search history.

(56) References Cited

U.S. PATENT DOCUMENTS

| | | | |
|---|---|---|---|
| 3,260,715 A | 7/1966 | Saunders | |
| 3,322,680 A | 5/1967 | Hedberg et al. | |
| 3,449,257 A | 6/1969 | Tuite et al. | |
| 3,501,298 A | 3/1970 | Crawford | |
| 4,106,941 A | 8/1978 | Scullard et al. | |
| 4,794,071 A | 12/1988 | Tomko et al. | |
| 4,859,539 A | 8/1989 | Tomko et al. | |
| 4,882,412 A * | 11/1989 | Weaver et al. ............. 528/190 | |
| 5,061,610 A | 10/1991 | Carroll et al. | |
| 5,173,397 A | 12/1992 | Noda et al. | |
| 5,340,854 A | 8/1994 | Martic et al. | |
| 6,177,574 B1 * | 1/2001 | Chamberlin ............... 548/219 |
| 6,312,822 B1 | 11/2001 | Irick, Jr. et al. | |
| 6,492,032 B1 | 12/2002 | Irick, Jr. et al. | |
| 6,756,350 B1 * | 6/2004 | Giblin et al. ............... 510/277 |
| 6,773,104 B1 * | 8/2004 | Cornelius et al. ........... 347/106 |

FOREIGN PATENT DOCUMENTS

| | | |
|---|---|---|
| EP | 0 795 399 A1 | 9/1997 |
| JP | 9-239883 A | 9/1997 |

OTHER PUBLICATIONS

*Handbook of Polymer Degradation*, 2$^{nd}$ Ed., J. E. Pickett, S. Halim Hamid, ed. Marcel Dekker, NY, pp. 163-190 (2000).
*Handbook of Polymer Degradation*, N. D. Searle, pp. 605-643.
*Kirk-Othmer Encyclopedia of Chemical Technology*, 3$^{rd}$ Ed., Interscience, NY, 4, 213-226 (1978).
J. T. Lutz, Jr., *Thermoplastic Polymer Additives*, Marcel Dekker, NY, pp. 315-344 (1989).
Anni Berger-Schunn, *Practical Color Measurement*, pp. 35-56 and 91-98, Wiley, NY (1994).
*Plastics Engineering*, 29(9), "Plastics Come Alive Brightened with Fluorescent Whiteners", Sep. 1973, pp. 36-39.
Zweifel, Hans, Plastics Additives Handbook, 2001, pp. 885-886, 5$^{th}$ Edition, Hanser Gardner Publications, Inc., Cincinnati, Ohio.

* cited by examiner

*Primary Examiner*—Terressa Boykin
(74) *Attorney, Agent, or Firm*—B. J. Boshears; Bernard J. Graves, Jr.

(57) ABSTRACT

An ultraviolet absorption composition has been developed for the protection of packaging or container contents in the ultraviolet range of 290 nm to 390 nm, offering effective screening from all wavelengths of solar radiation. A combination of an optical brightener with an ultraviolet absorber has been found to provide effective screening without adding significant color to the polymer composition. This extended range of ultraviolet blocking over what can be achieved with ultraviolet absorbers alone is especially valuable in food and drink packaging applications where the contents of the packages need ultraviolet protection to prevent discoloration or development of undesirable flavors.

22 Claims, 3 Drawing Sheets

ULTRAVIOLET BLOCKING COMPOSITION FOR PROTECTION OF PACKAGE OR CONTAINER CONTENTS

FIELD OF THE INVENTION

This invention belongs to the field of polymers, in particular polymeric packaging or containers. The invention provides new polymeric compositions which can provide ultraviolet protection to materials which they cover or contain. More particularly, the invention provides a polyester composition comprising a mixture of one or more ultraviolet absorbers and one or more optical brighteners.

BACKGROUND OF THE INVENTION

The use of ultraviolet absorbers for the protection of polymeric compositions is well-known. A review of the various product types is provided by J. E. Pickett, *Handbook of Polymer Degradation*, $2^{nd}$ Ed., S. Halim Hamid, ed. Marcel Dekker, NY, pp 163–190, (2000). The common structural types are: Benzophenones, Benzotriazoles, Triazines, Oxanilides, Cyanoacrylates, Malonates, Formamidines and Benzoxazinones.

These products are generally designed to absorb solar ultraviolet radiation in the 290–390 nm wavelength range, with maximum absorption in the regions where the commercial polymers exhibit their greatest sensitivity. For example, the greatest sensitivity to yellowing of various polymers is as follows: polycarbonates (295 and 310–340 nm), polystyrene (319 nm), polyethylene (310 nm), ABS (330 nm), and PVC (308–325 nm): N. D. Searle, *Handbook of Polymer Degradation*, p. 615. Since most polymers have their greatest sensitivity at wavelengths below 340 nm, or the UVB region, the ultraviolet absorbers will generally show weaker absorption in the wavelengths above 340 nm, or the UVA region of the solar spectrum. An additional reason for the relatively short wavelength absorption of the commercial ultraviolet stabilizers is to prevent their absorption from extending into the visible region greater than 400nm, thereby imparting color to the polymeric materials in which they are incorporated.

If ultraviolet absorbers are used alone for ultraviolet screening applications, they will show deficient light absorption in the UVA region, to which many foods are sensitive, and if they are used at sufficiently high concentrations to provide strong absorption in the UVA region, they will impart color to the polymers in which they are incorporated.

Optical brighteners (also known as fluorescent whitening agents and optical bleaches) have been used for many years to impart a desirable "blueness" to polymers. These are compounds which absorb ultraviolet radiation in the ultraviolet region and re-emit it as fluorescence in the blue region of the visible spectrum. Detailed reviews of optical brightener structures, properties and end-uses have been provided in: *Kirk-Othmer Encyclopedia of Chemical Technology*, $3^{rd}$ Ed., Interscience, NY, 4, 213–220 (1978); and J. T. Lutz, Jr., Thermoplastic Polymer Additives, Marcel Dekker, NY, pp 315–343 (1989).

This invention provides polymeric compositions which overcome the deficiencies of the ultraviolet absorbers alone as screening agents, and which provide excellent screening protection throughout the solar ultraviolet region without adding undue color to the polymeric compositions.

SUMMARY OF THE INVENTION

The present invention provides, in one embodiment, an ultraviolet absorption composition which is useful in packaging or containers, which provides considerable protection for its contents in the ultraviolet range of 290 nm to 400 nm, thereby offering effective screening from all wavelengths of solar radiation. Thus, in one embodiment, the invention provides a polymer composition comprising
  (a) a polyester;
  (b) at least one ultraviolet absorber; and
  (c) at least one optical brightener in a concentration of greater than 0.0004 wt %, based on the total weight of the polyester composition;
  wherein said composition is comprised of no more than 5 weight percent of polymers which are other than polyesters;
  wherein said composition is effective at screening of at least 85% of the light of wavelengths of 290–390 nm.

In a further embodiment, said composition exhibits a CIE b* value of no greater than 6.0 in a 50 micrometer thick film prepared from said composition.

Some packaging polymers such as acrylics and vinyl esters exhibit >80% transmission in the ultraviolet range of 290nm to 400nm; polyesters such as poly(ethylene terephthalate) exhibit <10% transmission in the 290nm to 320nm range, but show >80% transmission in the 320 to 400nm range. Thus, regardless of the thickness of the packaging, the contents will not be effectively screened by the packaging polymer alone. It is desirable to limit the exposure of contents to less than 10% transmitted light of wavelengths from 290nm to 390nm. While it is possible to screen throughout the entire 290nm to 400nm range, this would be undesirable because of the color which would be imparted to the packaging polymer.

The ultraviolet absorption composition of the present invention will typically be in the form of: a film having a thickness of from 10 to 250 micrometers; a container having a thickness of from 250 to 1000 micrometers; or a sheet having a thickness of from 500 to 5000 micrometers. While these are typical thicknesses for the ultraviolet absorption compositions, it should be recognized that other useful thicknesses will lie outside those noted for the film, container, and sheet compositions A combination of an optical brightener with an ultraviolet absorber has been found to provide effective screening without adding significant color to the polymer composition. Stilbene brighteners such as Eastman Chemical Company's EASTOBRITE OB-1 are preferred for this invention because of their high absorptivity and good compatibility with polyesters. This extended range of ultraviolet blocking over what can be achieved with ultraviolet absorbers alone is especially valuable in food and drink packaging applications where the contents of the packages need ultraviolet protection to prevent discoloration or development of undesirable flavors.

DETAILED DESCRIPTION OF THE INVENTION

Figure 1:
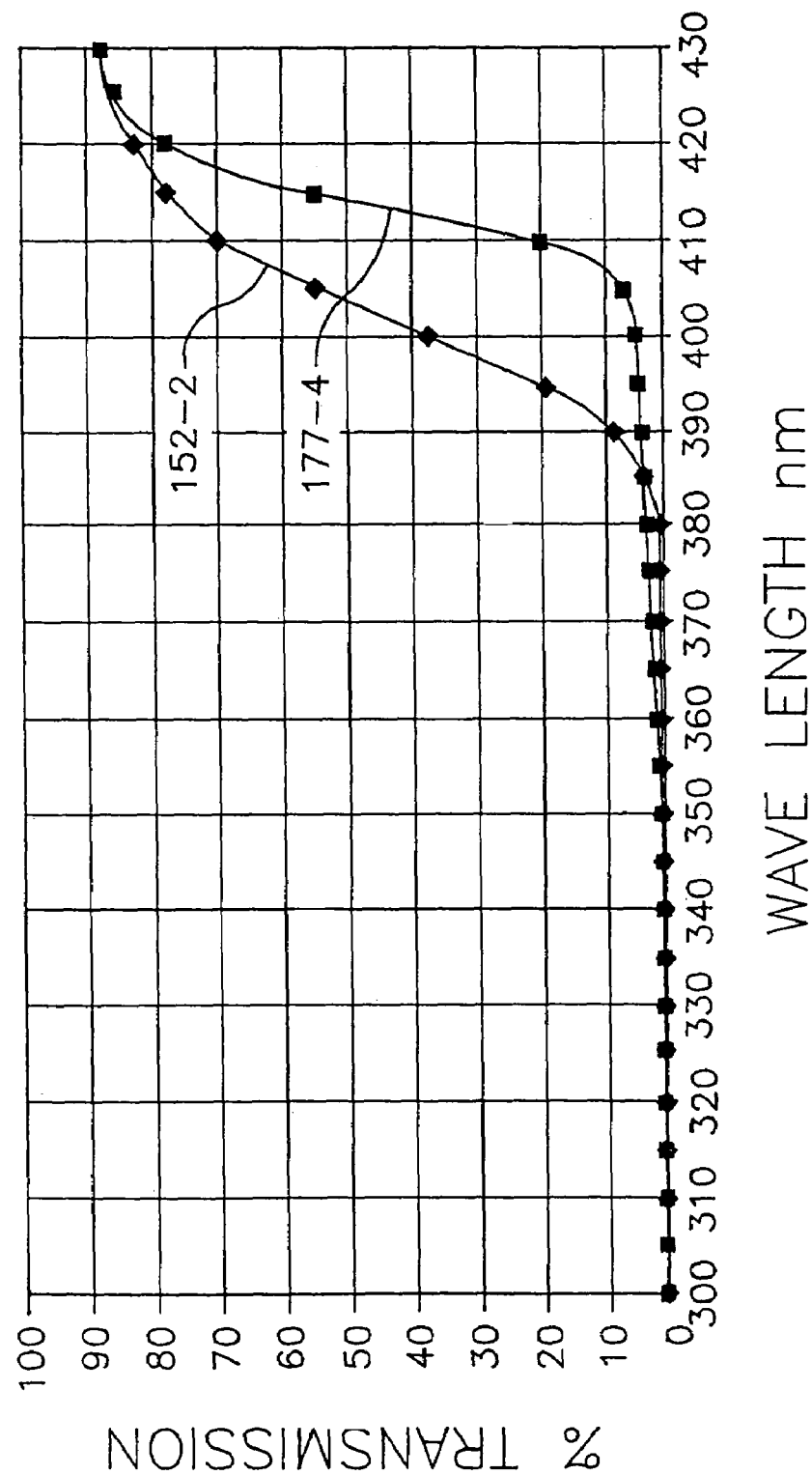
FIG. 1 is a plot of the % transmission versus wavelength (nm) for a sample containing (designated 152-2) which had 1.65 wt. % of UV absorber UVINUL 3049 (BASF Aktiengesellschaft) compared to a sample (designated 177-4), which has 64% less UV absorber, i.e., with 0.6 wt. % of the UVINUL 3049 and 0.17 wt. % EASTOBRITE OB1 optical brightener.

The present invention provides a polymer composition comprising
 (a) a polyester;
 (b) at least one ultraviolet absorber; and
 (c) at least one optical brightener in a concentration of greater than 0.0004 wt %, based on the total weight of the polyester composition;
 wherein said composition is comprised of no more than 5 weight percent of polymers which are other than polyesters;
 wherein said composition is effective at screening of at least 85% of the light of wavelengths of 290–390 nm.

In a further embodiment, said composition exhibits a CIE b* value of no greater than 6.0 in a 50 micrometer thick film prepared from said composition.

The CIE (Commission International d'Eclairage) b* value, an internationally accepted yellowness measurement was used as an indication of the yellowness resulting from the absorption of light of wavelengths greater than 400 nanometers. Color measurement theory and practice are discussed in greater detail in Anni Berger-Schunn in *Practical Color Measurement*, pp. 39–56 and 91–98, Wiley, NY (1994). See also, U.S. Pat. Nos. 6,492,032 and 6,312,822, incorporated herein by reference.

The concentrations of ultraviolet absorber(s) and optical brightener(s) are chosen to provide the level of screening required to protect the material that the polyester composition is covering; these concentrations will generally be a level which will permit less than 15% of the incident light at any wavelength throughout the 290 to 380nm region to pass through the polyester composition. The exact concentrations of (b) and (c) to be used will depend on the thickness of the polyester composition. For example, one-half as much (b) and (c) would be required for a 100 micrometer thick film as for one which is 50 micrometer thick.

In one embodiment, for a 50 micrometer thick film, an optical brightener concentration of from 0.05 to 0.6 wt % may be utilized; in a further embodiment, 0.1 to 0.3 wt % may be utilized. Such optical brightener amounts may then be utilized, in combination with an ultraviolet absorber, in one embodiment, in a concentration of from 0.1 to 4 wt %, and in another embodiment, in a concentration of about 0.4 to 2 wt %. Similarly, for a 500 micrometer thick composition, an optical brightener concentration of from 0.005 to 0.08 wt % may be utilized in one embodiment, while in another embodiment 0.01 to 0.03 wt % may be utilized. Such optical brightener amounts may then be utilized, in combination with an ultraviolet absorber, in one embodiment, in a concentration of from 0.01 to 0.8 wt %, and in another embodiment, in a concentration of from 0.05 to 0.2 wt %. Similarly, for a sheet having a thickness of 3000 micrometers, an optical brightener concentration of from 0.0005 to 0.01 wt % may be utilized in one embodiment, while in another embodiment 0.0005 to 0.006 wt % may be utilized. Such optical brightener amounts may be utilized, in one embodiment, in combination with an ultraviolet absorber in a concentration of from 0.001 to 0.08 wt %, in one embodiment, and from 0.004 to 0.04 wt % in another embodiment will be useful.

Optical brighteners are generally used at concentrations of from 5 to 500 parts per million (0.05 wt % or less) for brightening of polymers, while ultraviolet absorbers are used at 0.5 to 4 wt %. For this invention, the optical brightener will always be used at concentrations greater than 0.0004 wt %, with a maximum of 0.6 wt.%, depending on the thickness of the ultraviolet absorption composition as discussed above. The high level of screening obtained by the combination of the ultraviolet absorber and optical brightener without imparting undesirable yellowness to the polymer is unusual; to achieve such high levels of screening with the ultraviolet absorber alone would in some cases be impossible, and in others, significant yellowing of the polymer would occur. The high level of screening provided by this invention is thus very useful for protecting wrapped and bottled foods from undergoing color and flavor changes when exposed to ultraviolet light from sunlight, or from artificial lighting sources.

The optical brighteners useful in the present invention can be any class of materials having an absorption in the range of 280–405 nanometers (nm) and an emission in the visible spectrum of from about 400–450 nanometers. The most useful optical brighteners include stilbenes, substituted stilbenes and stilbene derivatives. Suitable examples of such optical brighteners include bis(benzoxazolyl) stilbenes such as those disclosed in U.S. Pat. No. 4,794,071, the disclosure of which is incorporated herein by reference. In a preferred embodiment, the optical brighteners include the optical brightener OB-1 ™, a stilbene available from Eastman Chemical Company, Kingsport Tennessee described in U.S. Pat. Nos. 3,260,715 and 3,322,680, and HOSTALUX™ KS, a mixture of stilbenes available from Hoechst AG described in U.S. Pat. No. 4,794,071, the entire disclosures of each being incorporated herein by reference.

Other optical brighteners include mono(azol-2-yl)stilbenes, such as, 2-(stilben4-yl)naphthotriazoles and 2-(4-phenylstilben-4-yl)benzoxazoles;

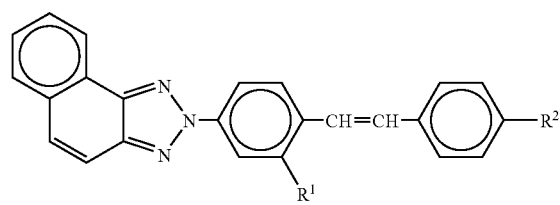

wherein $R^1$ is hydrogen or C≡N and $R^2$ is hydrogen or chlorine.

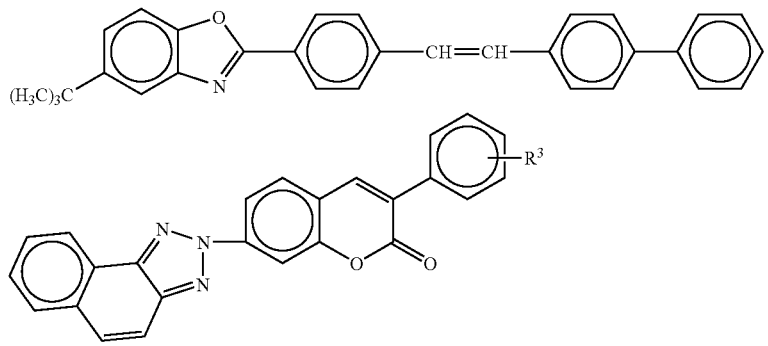

wherein $R^3$ is hydrogen or alkyl.

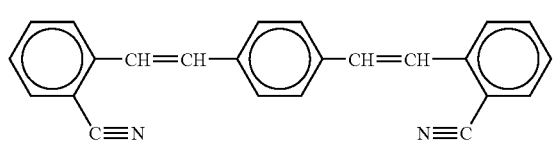

Bis(benzoxazol-2-yl) derivatives, such as:

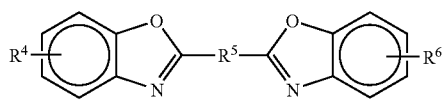

wherein $R^5$ is $C_2H_2$ and $R^4$ and $R^6$ are independently selected from alkyl or $CH_3$, $R^5$ is

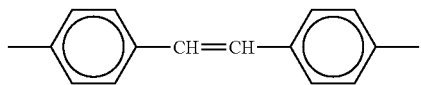

and $R^4$ and $R^6$ are independently selected from hydrogen and alkyl, $R^5$ is

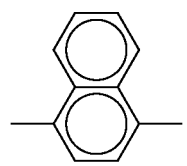

and $R^4$ and $R^6$ are independently selected from hydrogen, alkyl, COO-alkyl, and $SO_2$-alkyl, and $R^5$ is

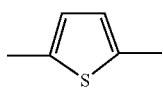

and $R^4$ and $R^6$ are independently selected from hydrogen and alkyl, wherein in all cases $R^5$ above represents a conjugated system.

Bis(benzimidazol-2-yl) derivatives of the formula:

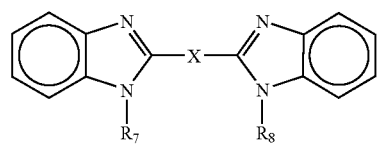

wherein "X" is —$C_2H_2$— or

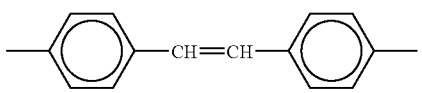

and $R^7$ and $R^8$ are independently selected from hydrogen, alkyl, hydroxyalkyl, and the like.

In yet another embodiment, the optical brighteners include 4,4'-bis(2-benzoxazolyl)stilbene; (available from Eastman Chemical Company under the trademark EASTOBRITE OB-1); 2,5-bis(5-tert-butyl-2-benzoxazolyl) thiophene (available from Ciba Specialty Chemicals under the trademark UVITEX OB); 4,4'-bis(methyl-2-benzoxazolyl)stilbene; 4-(methyl-2-benzoxazolyl)-4'-(2-benzoxazolyl)stilbene; and mixtures thereof.

The ultraviolet light absorbers are known in the art. Examples of suitable ultraviolet light absorbers include the following:

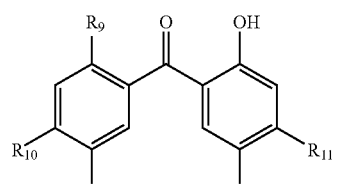

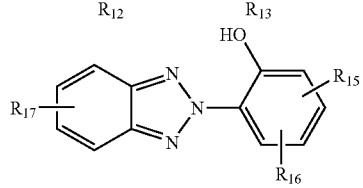

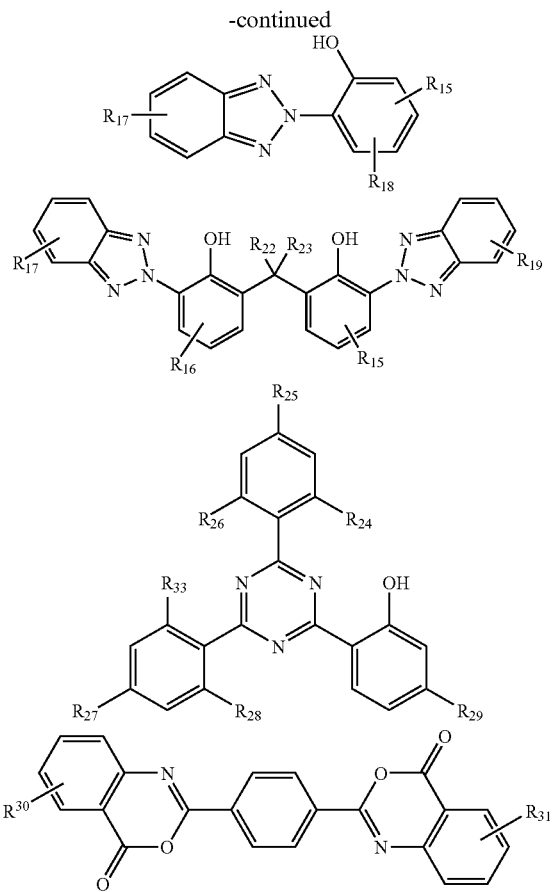

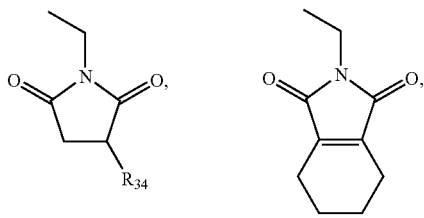

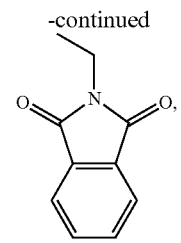

and may be located at the 3', 4', 5' or 6' positions on the aromatic ring;

$R_{22}$ and $R_{23}$ are independently selected from hydrogen, $C_1$–$C_{22}$-alkyl, substituted $C_1$–$C_{22}$-alkyl, $C_3$–$C_8$-cycloalkyl, and substituted $C_3$–$C_8$-cycloalkyl;

$R_{24}$, $R_{25}$, $R_{26}$, $R_{27}$, $R_{28}$ and $R_{33}$ are independently selected from hydrogen, $C_1$–$C_{22}$-alkyl, substituted $C_1$–$C_{22}$-alkyl, $C_3$–$C_8$-cycloalkyl, and substituted $C_3$–$C_8$-cycloalkyl;

$R_{29}$ is selected from hydrogen, $C_1$–$C_{22}$-alkyl, substituted $C_1$–$C_{22}$-alkyl, $C_3$–$C_8$-cycloalkyl, substituted $C_3$–$C_8$-cycloalkyl and —$OR_{21}$;

$R_{30}$ and $R_{31}$ are independently selected from hydrogen, $C_1$–$C_{22}$-alkyl, substituted $C_1$–$C_{22}$-alkyl, $C_3$–$C_8$-cycloalkyl, substituted $C_3$–$C_8$-cycloalkyl and may be located at the 5, 5', 6, 6', 7, 7', 8 or 8' positions on the aromatic ring, respectively;

$R_{34}$ is selected from hydrogen, $C_1$–$C_{22}$-alkyl, substituted $C_1$–$C_{22}$-alkyl, $C_3$–$C_8$-cycloalkyl, substituted $C_3$–$C_8$-cycloalkyl, heteroaryl, and aryl;

$Y_1$ is selected from —OC(O)—, —NHC(O)—, —O—, —S—, —N($R_{35}$)—;

$R_{35}$ is selected from hydrogen, $C_1$–$C_{22}$-alkyl, substituted $C_1$–$C_{22}$-alkyl, $C_3$–$C_8$-cycloalkyl, substituted $C_3$–$C_8$-cycloalkyl, heteroaryl, and aryl;

N2 is a positive integer selected from 1 to about 20;

Whenever an R group, Y group or N group is defined herein, the definition for a particular group remains the same throughout this description regardless of whether it is used for multiple formulas or types of compounds unless otherwise specified.

The term "$C_1$–$C_{22}$-alkyl" denotes a saturated hydrocarbon radical which contains one to twenty-two carbons and which may be straight or branched-chain. Such $C_1$–$C_{22}$ alkyl groups can be methyl, ethyl, propyl, butyl, pentyl, hexyl, heptyl, octyl, isopropyl, isobutyl, tertbutyl, neopentyl, 2-ethylheptyl, 2-ethylhexyl, and the like. The term "substituted $C_1$–$C_{22}$-alkyl" refers to $C_1$–$C_{22}$-alkyl radicals as described above which may be substituted with one or more substituents selected from hydroxy, halogen, cyano, aryl, heteroaryl, $C_3$–$C_8$-cycloalkyl, substituted $C_3$–$C_8$-cycloalkyl, $C_1$–$C_6$-alkoxy, $C_2$–$C_6$ alkanoyloxy and the like.

The term "$C_3$–$C_8$-cycloalkyl" is used to denote a cycloaliphatic hydrocarbon radical containing three to eight carbon atoms. The term "substituted $C_3$–$C_8$-cycloalkyl" is used to describe a $C_3$–$C_8$-cycloalkyl radical as detailed above containing at least one group selected from $C_1$–$C_6$-alkyl, $C_1$–$C_6$-alkoxy, hydroxy, halogen, and the like.

The term "aryl" is used to denote an aromatic radical containing 6, 10 or 14 carbon atoms in the conjugated aromatic ring structure and these radicals substituted with one or more groups selected from $C_1$–$C_6$-alkyl; $C_1$–$C_6$-alkoxy; phenyl, and phenyl substituted with $C_1$–$C_6$-alkyl; $C_1$–$C_6$-alkoxy; halogen and the like; $C_3$–$C_8$-cycloalkyl; halogen; hydroxy, cyano, trifluoromethyl and the like. Typical aryl groups include phenyl, naphthyl, phenylnaphthyl, wherein $R_9$, $R_{10}$, and $R_{11}$ are independently selected from hydrogen, hydroxy, $C_1$–$C_{22}$-alkyl, substituted $C_1$–$C_{22}$-alkyl, $C_3$–$C_8$-cycloalkyl, substituted $C_3$–$C_8$-cycloalkyl and $OR_{14}$;

$R_{12}$ and $R_{13}$ are independently selected from hydrogen and —$SO_3R_{15}$;

$R_{14}$ is selected from $C_1$–$C_{22}$-alkyl, substituted $C_1$–$C_{22}$-alkyl, $C_3$–$C_8$-cycloalkyl, and substituted $C_3$–$C_8$-cycloalkyl;

$R_{15}$ and $R_{16}$ are independently selected from hydrogen, $C_1$–$C_{22}$-alkyl, substituted $C_1$–$C_{22}$-alkyl, $C_3$–$C_8$-cycloalkyl, substituted $C_3$–$C_8$-cycloalkyl and may be located at the 3', 4', 5' or 6' positions on the aromatic ring;

$R_{17}$ and $R_{19}$ are independently selected from hydrogen, halogen, $C_1$–$C_{22}$-alkyl, substituted $C_1$–$C_{22}$-alkyl, $C_3$–$C_8$-cycloalkyl, substituted $C_3$–$C_8$-cycloalkyl, and may be located at the 4, 5, 6 or 7 positions on the aromatic ring;

wherein $R_{18}$ is selected from —(CH$_2$CH$_2$—$Y_1$)$_{N2}$—CH$_2$CH$_2$—$R_{20}$, a group having the formula anthryl (anthracenyl) and the like. The term "heteroaryl" is used to describe conjugated cyclic radicals containing at least one hetero atom selected from sulfur, oxygen, nitrogen or a combination of these in combination with from two to about ten carbon atoms and these heteroaryl radicals substituted with the groups mentioned above as possible substituents on the aryl radical. Typical heteroaryl radicals include: 2-and 3-furyl, 2- and 3-thienyl, 2- and 3-pyrrolyl, 2-, 3-, and 4-pyridyl, benzothiophen-2-yl; benzothiazol-2-yl, benzoxazol-2-yl, benzimidazol-2-yl, 1,3,4-oxadiazol-2-yl, 1,3,4-thiadiazol-2-yl, 1,2,4-thiadiazol-5-yl, isothiazol-5-yl, imidazol-2-yl, quinolyl and the like.

The terms "$C_1$–$C_6$-alkoxy" and "$C_2$–$C_6$-alkanoyloxy" are used to represent the groups —O—$C_1$–$C_6$-alkyl and —OCOC$_1$–$C_6$-alkyl, respectively, wherein "$C_1$–$C_6$-alkyl" denotes a saturated hydrocarbon that contains 1–6 carbon atoms, which may be straight or branched-chain, and which may be further substituted with one or more groups selected from halogen, methoxy, ethoxy, phenyl, hydroxy, acetyloxy and propionyloxy. The term "halogen" is used to represent fluorine, chlorine, bromine, and iodine; however, chlorine and bromine are preferred.

The term "$C_2$–$C_{22}$-alkylene" is used to denote a divalent hydrocarbon radical that contains from two to twenty-two carbons and which may be straight or branched chain and which may be substituted with one or more substituents selected from hydroxy, halogen, $C_1$–$C_6$-alkoxy, $C_2$–$C_6$-alkanolyloxy and aryl. The term "$C_3$–$C_8$-cycloalkylene" is used to denote divalent cycloaliphatic radicals containing three to eight carbon atoms and these are optionally substituted with one or more $C_1$–$C_6$-alkyl groups. The term "arylene" is used to denote 1,2-, 1,3-, and 1,4-phenylene radicals and these optionally substituted with $C_1$–$C_6$- alkyl, $C_1$–$C_6$-alkoxy and halogen.

In one mbodiment, the ultraviolet light absorbers useful in the present invention belong to the class of bis-benzoxazolylstilbenes.

In one preferred embodiment of this invention, there is provided a polyester having diacid residues of from 70 to 100% terephthalic acid and from 0 to 30% isophthalic acid, and glycol residues of from 0 to 100% 1,4-cyclohexanedimethanol and from 0 to 100% ethylene glycol. The ultraviolet absorber will be one or more compounds chosen from the hydroxybenzophenone, benzotriazole, triazine, cyanoacrylate, malonate or benzoxazinone classes, and the optical brightener will be one or more compounds chosen from the stilbene, naphthalene, coumarin, pyrazoline or thiophene classes.

In another preferred embodiment of this invention, there is provided a polyester comprising one or more stilbene optical brighteners and one or more hydroxybenzophenone, benzotriazole or triazine ultraviolet absorbers.

EXPERIMENTAL SECTION

The formulation containing polyester, ultraviolet absorber and optical brightener was made into film to show screening of 90% of the UV region up to 400 nm. The success of the optical brightener to provide additional screening while decreasing the level of UV absorber in the film can be demonstrated.

Figure 2:
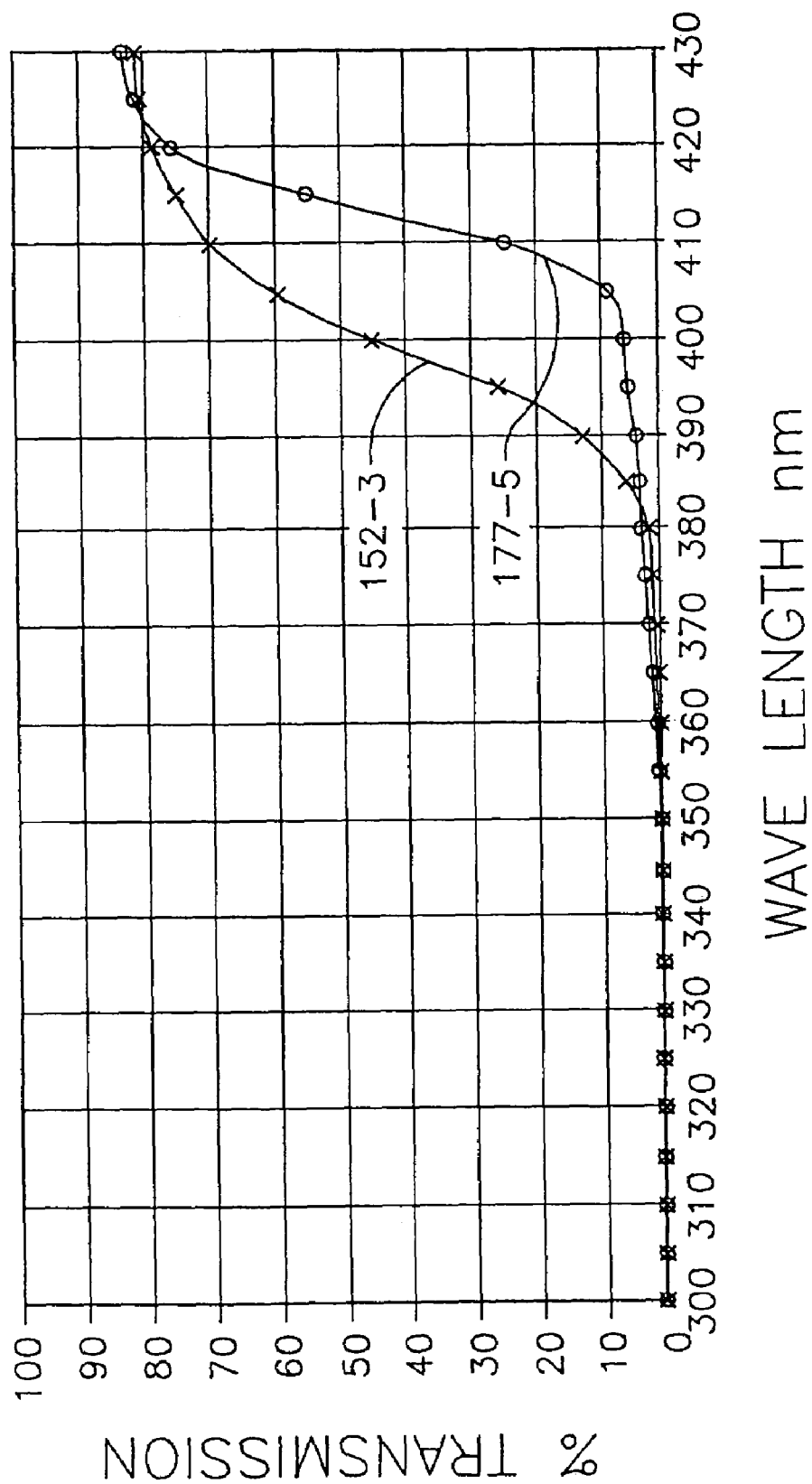
FIG. 2 is a transmission plot comparison of sample 152-3 has 1.65 wt. % UVINUL 3050 and sample 177-5 has 0.6 wt % UVINUL 3050 with 0.17 wt. % OB1 optical brightener and again the increased UV screening is demonstrated.

Referring to FIG. 1, Sample 152-2 has 1.65 wt. % of UV absorber UVINUL 3049 and the effectiveness of the films ability for UV absorption can be seen in FIG. 1. When compared to sample 177-4, which has 64% less UV absorber, with 0.6 wt. % of the UVINUL 3049 and 0.17 wt. % OB1 optical brightener. Incorporating the OB1 into the film increases the films ability to provide a greater screening window while lowering the amount of UV absorber in the formula. This example is repeated in FIG. 2 where sample 152-3 has 1.65 wt. % UVINUL 3050 and sample 152-3 has 1.65 wt. % UVINUL 3050 and sample 177-5 has 0.6 wt % UVINUL 3050 with 0.17 wt. % OB1 optical brightener and again the increased UV screening is demonstrated.

Figure 3:
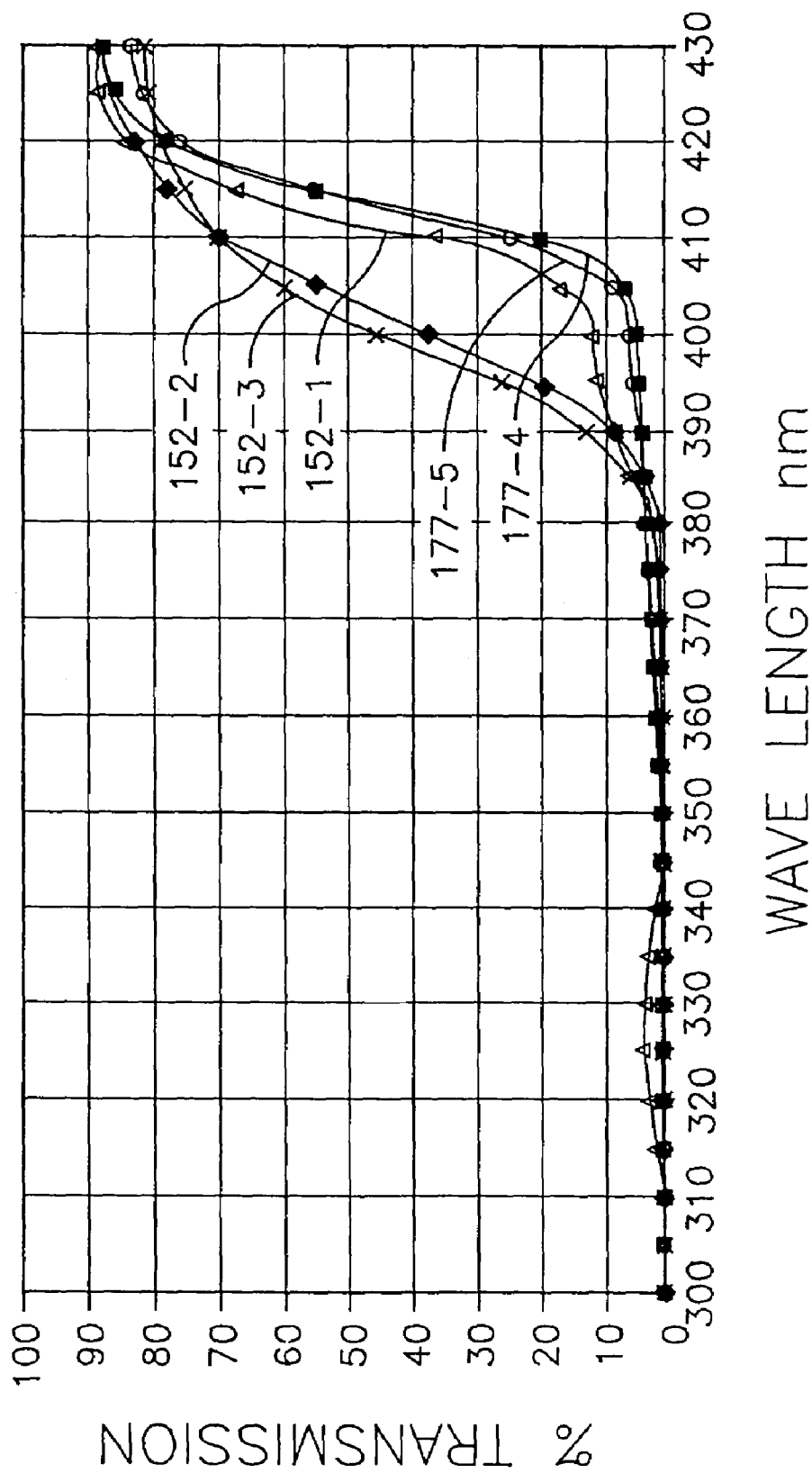
FIG. 3 is a transmission plot of sample 152-1 which has a composition of 0.9 wt. % TINUVIN 234 UV absorber and 0.17 wt. % EASTOBRITE OB-1 optical brightener in comparison to the other samples. The amounts of optical brightener and ultraviolet light absorber in each sample is set forth in Table 1 below.

FIG. 3 shows sample 152-1 which has a composition of 0.9 wt. % TINUVIN 234 UV absorber and 0.17 wt. % OB1 optical brightener in comparison to the other samples.

The film samples were extruded on conventional extrusion equipment that consisted of a 50 mm (2 inch) extruder using a 760 mm (30 inch) die and casting the film on a chilled roll. The film formulations were let down from three different UV concentrates and one OB concentrate, all four concentrates were compounded into the base polyester resin. The UV concentrates were X-26030-132-1 consisting of 10 wt. % TINUVIN 234 in copolyester 21214, UV concentrate X-26030-132-3 consisting of 5 wt. % UVINUL 3049 in copolyester 21214 and X-26030-132-4 consisting of 5 wt. % UVINUL 3050 in copolyester 21214. The OB concentrate was X-26030-132-2 consisting of 10 wt. % of Eastman's OB-1 in copolyester 21214. The film samples were produced using the concentrates let down into copolyester 21214 at various ratios. Table 1 shows the five film samples and the different wt. % loadings of the OB additive and different UV additives. All film samples were 50 micrometers in thickness.

TABLE 1

| Film | X-26021 | | | | |
|---|---|---|---|---|---|
| Samples | 152-1 | 152-2 | 152-3 | 177-4 | 177-5 |
| Optical Brightener | .17 wt. % OB-1 | | | .17 wt. % OB-1 | .17 wt. % OB-1 |
| Ultraviolet Absorber | .9 wt. % Tinuvin 234 | 1.65 wt. % Uvinul 3049 | 1.65 wt. % Uvinul 3050 | .6 wt. % Uvinul 3049 | .6 wt. % Uvinul 3050 |

We claim:

1. A polymer composition, wherein said composition has been extruded, comprising
   (a) a polyester;
   (b) at least one ultraviolet absorber in a concentration of 0.1 to 4 wt %; and
   (c) at least one optical brightener in a concentration of 0.05 to 0.6 wt %, based on the total weight of the polyester composition;
   wherein said polymer is comprised of no more than 5 weight percent of polymers which are other than polyesters;
   wherein said composition is effective at screening of at least 85% of the light of wavelengths of 290–390 nm.

2. The polymer composition of claim 1, wherein said composition exhibits a CIE b* value of no greater than 6.0 in a 50 micrometer thick film prepared from said composition.

3. The composition of claim 1 where the ultraviolet absorber is selected from the group consisting of the benzophenone, benzotriazole, triazine, oxanilide, cyanoacrylate, malonate, formamidine and benzoxazinone classes.

4. The composition of claim 1 where the optical brightener is selected from the group consisting of the stilbene, coumarin, naphthalene and thiophene classes.

5. The composition of claim 3 where the ultraviolet absorbers are selected from the benzophenone, benzotriazole and triazine classes.

6. The composition of claim 4 where the brighteners contain a benzoxazole functionality.

7. The composition of claim 6 where the brighteners are benzoxazolyl-stilbenes.

8. The composition of claim 6 where at least one of the brighteners is 4,4'-bis(2-benzoxazolyl)stilbene.

9. The composition of claim 1, wherein the ultraviolet light absorber is present in a concentration of 0.4 to 2 weight percent and the optical brightener is present in a concentration of 0.1 to 0.3 weight percent.

10. The composition of claim 1, wherein the ultraviolet light absorber is present in a concentration of 0.01 to 0.8 weight percent and the optical brightener is present in a concentration of 0.005 to 0.08 weight percent.

11. The composition of claim 1, wherein the ultraviolet light absorber is present in a concentration of 0.05 to 0.2 weight percent and the optical brightener is present in a concentration of 0.1 to 0.03 weight percent.

12. The composition of claim 1, wherein the ultraviolet light absorber is present in a concentration of 0.001 to 0.08 weight percent and the optical brightener is present in a concentration of 0.0005 to 0.01 weight percent.

13. The composition of claim 1, wherein the ultraviolet light absorber is present in a concentration of 0.004 to 0.04 weight percent and the optical brightener is present in a concentration of 0.0005 to 0.006 weight percent.

14. The composition of claim 1, further comprising 0.2 to 15 weight percent of titanium dioxide having a mean particle size of less than or equal to 0.1 microns.

15. A shaped or formed article comprising the polyester composition of claim 1.

16. The article of claim 15, further comprising 0.2 to 15 weight percent of titanium dioxide having a mean particle size of less than or equal to 0.1 microns.

17. The article of claim 15, wherein the polyester composition is in the form of a film.

18. The article of claim 15, wherein the polyester composition is in the form of a container.

19. The article of claim 15, wherein the polyester composition is in the form of a flat or formed sheet.

20. A method for protecting a material susceptible to degradation via ultraviolet light, which comprises surrounding at least part of said material with a polymer composition, wherein said composition has been extruded, comprising
   (a) a polyester;
   (b) at least one ultraviolet absorber in a concentration of 0.1 to 4 wt %; and
   (c) at least one optical brightener in a concentration of 0.05 to 0.6 wt %, based on the total weight of the polyester composition;
   wherein said polymer is comprised of no more than 5 weight percent of polymers which are other than polyesters;
   wherein said composition is effective at screening of at least 85% of the light of wavelengths of 290–390 nm.

21. The method of claim 20, wherein said composition exhibits a CIE b* value of no greater than 6.0 in a 50 micrometer thick film prepared from said composition.

22. The method of claim 20, wherein the material is a foodstuff or beverage.

* * * * *